No. 731,631.

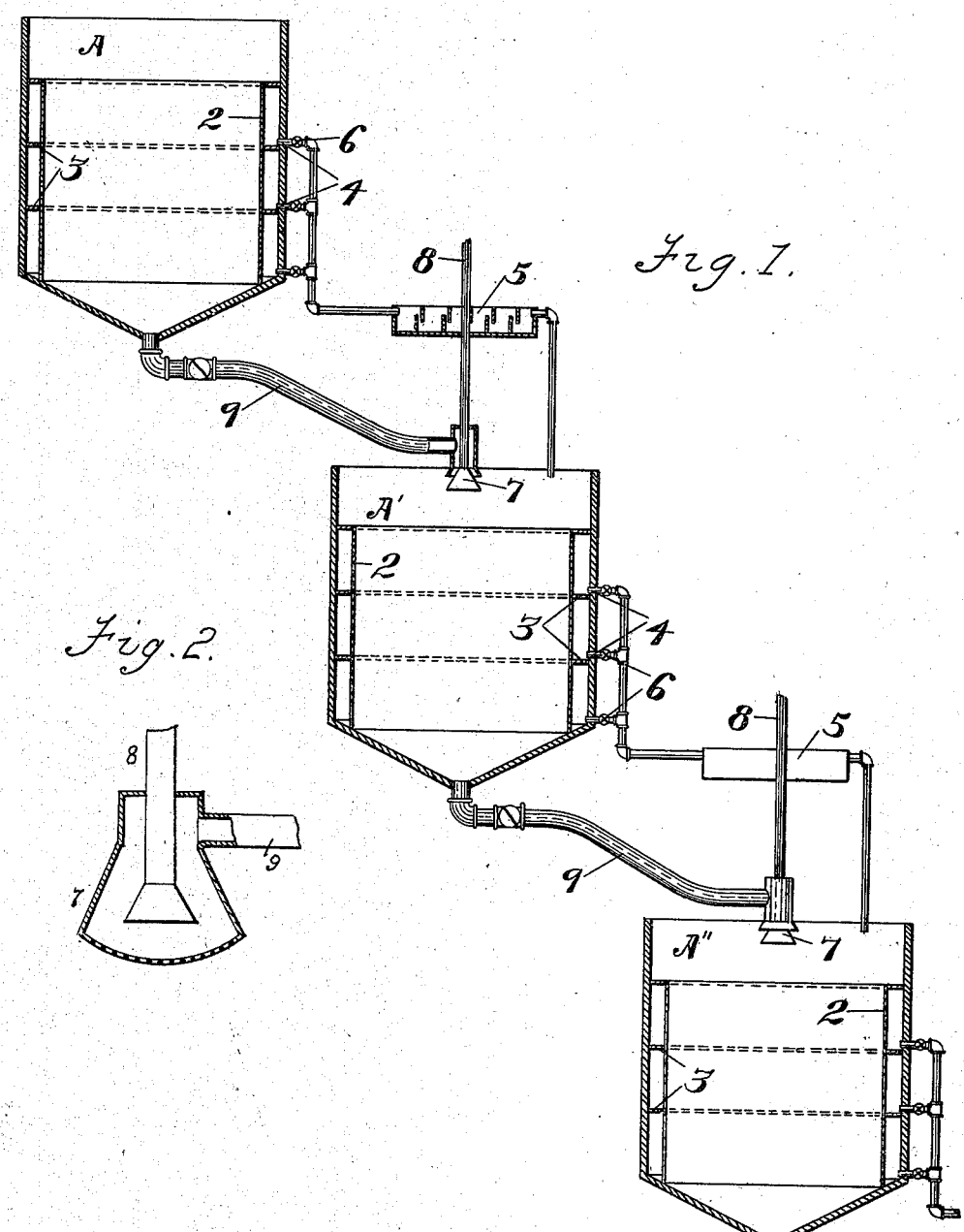

Patented June 23, 1903.

UNITED STATES PATENT OFFICE.

JOSEPH T. TERRY, JR., OF ALTAR, MEXICO, ASSIGNOR OF ONE-HALF TO J. O. TREANOR, OF ALTAR, MEXICO.

EXTRACTING GOLD OR SILVER FROM SLIMES.

SPECIFICATION forming part of Letters Patent No. 731,631, dated June 23, 1903.

Application filed September 9, 1902. Serial No. 122,748. (No model.)

*To all whom it may concern:*

Be it known that I, JOSEPH T. TERRY, Jr., a citizen of the United States, residing in the city of Altar, Sonora, Mexico, have invented an Improvement in Extracting Gold and Silver from Slimes and the Like; and I hereby declare the following to be a full, clear, and exact description of the same.

My invention relates to improvements in the extraction of the precious metals from the slimes or other unleached material by the aid of cyanid solutions; and it consists in spraying the slimes or slime mixed with water and called "sludge" into tanks which are partly filled with the cyanid solution containing oxidizing agents, such as calcium hypochlorite, or other active chemical agents, such as bromo cyanid, and without agitation allowing the same to settle, drawing off the clear solution, then discharging the sludge into similar tanks filled with solution or water, allowing the mass to settle, then drawing off the clear liquid as before, which will be more fully explained by reference to the accompanying drawings, in which—

Figure 1 represents a plant operated by my system. Fig. 2 is an enlarged section of an atomizer 7.

In carrying out my invention I employ a series of tanks or containing vessels A A', &c., of any suitable form or shape, arranged successively, one lower than the other and provided with the vertical filters 2. These latter are divided into two or more sections by horizontal partitions 3. The sections have each a separate outlet-pipe 4, through which the solution in the tank can be drawn off into suitable extractor-boxes 5 and passed thence after the values have been recovered into the succeeding tanks, as shown, to be used over and over again. The flow through pipes 4 is controlled by suitable cocks 6. The tanks are partially filled with the strong cyanid solution containing suitable oxidizing agents, &c., and the slime or other unleached material may be mixed with water, forming what is known as "sludge," which is delivered into the top of the tank A through a suitable screen or atomizer 7 and distributed in a fine spray over the surface of the solution by means of an airblast entering the atomizer through pipe 8.

The solution may be made more dense by the addition of salt or other inert densifying agent. The water will thus not commingle with the solution to any appreciable degree, but will remain on the top of the solution, owing to the difference in specific gravities, and the slimes will settle to the bottom through and into the strong cyanid solution, which speedily dissolves out the precious metal. The clear solution passing through the filters can then be drawn from the surface through the pipes 4 without disturbing the lower portion.

Discharge-openings are made in the bottom of the tank, through which the sediment can be drawn off into a pipe 9 and passed thence on through succeeding tanks subject to the same spraying, settling, and filtering process until all the values have been extracted.

The number of tanks used would vary according to the character of the material to be worked.

Having thus described my invention, what I claim, and desire to secure by Letters Patent, is—

1. An improvement in working slimes and other unleachable material, consisting in spraying the sludge or solution into tanks partly filled with cyanid solution containing oxidizing or equivalent active chemical agent and made dense by the addition of an inert substance, allowing the mass to settle without agitation, then drawing off the clear liquor through vertically-disposed filters.

2. An improvement in separating precious metals from slimes with which they are mixed, consisting in forming a solution with water, spraying said solution into tanks containing a cyanid solution made dense by the addition of salt, allowing the slime to settle through and into the solution, then drawing the clear liquor from the top through vertically-disposed filters and discharging the sludge from the bottom into succeeding tanks containing a similar cyanid solution, allowing it to settle and again drawing off the clear liquor.

3. The process of cyaniding ores, consisting in mixing slimes and water to form a sludge, spraying this sludge upon the surface of a suitable cyanid solution, allowing the material to percolate through and settle at the bottom of said solution without agitation of the latter, and decanting the clear liquid.

In witness whereof I have hereunto set my hand.

JOSEPH T. TERRY, JR.

Witnesses:
WILLIAM GARDINER,
JAMES O. TREEMOR.